US011524431B2

(12) United States Patent
de Groot

(10) Patent No.: US 11,524,431 B2
(45) Date of Patent: Dec. 13, 2022

(54) METHOD OF MANUFACTURING SANDWICH PANEL

(71) Applicant: FITS HOLDING B.V., Driebergen (NL)

(72) Inventor: Martin Theodoor de Groot, Driebergen (NL)

(73) Assignee: FITS HOLDING B.V., Driebergen (NL)

( * ) Notice: Subject to any disclaimer, the term of this patent is extended or adjusted under 35 U.S.C. 154(b) by 0 days.

(21) Appl. No.: 15/743,061

(22) PCT Filed: Jul. 7, 2016

(86) PCT No.: PCT/NL2016/050488
§ 371 (c)(1),
(2) Date: Jan. 9, 2018

(87) PCT Pub. No.: WO2017/010871
PCT Pub. Date: Jan. 19, 2017

(65) Prior Publication Data
US 2018/0194044 A1 Jul. 12, 2018

(30) Foreign Application Priority Data
Jul. 10, 2015 (NL) ..................................... 2015138

(51) Int. Cl.
*B29C 44/34* (2006.01)
*B32B 5/20* (2006.01)
(Continued)

(52) U.S. Cl.
CPC ...... *B29C 44/3419* (2013.01); *B29C 44/1228* (2013.01); *B29C 44/586* (2013.01); *B32B 5/024* (2013.01); *B32B 5/026* (2013.01); *B32B 5/20* (2013.01); *B32B 5/245* (2013.01); *B32B 15/046* (2013.01); *B32B 27/065* (2013.01); *B32B 27/20* (2013.01); *B32B 27/281* (2013.01); *B32B 27/285* (2013.01); *B32B 27/286* (2013.01); *B29C 35/16* (2013.01);
(Continued)

(58) Field of Classification Search
CPC .......... B29C 44/1228; B29C 44/3419; B29C 44/58; B29C 44/586; B29C 33/3828; B29C 2071/025; B29C 35/16; B30B 15/061; B32B 27/285; B32B 27/286; B32B 27/281; B32B 27/20; B32B 27/065; B32B 15/046; B32B 5/245; B32B 5/026; B32B 5/024; B32B 5/20; B32B 2262/10; B32B 2260/023; B32B 2262/101; B32B 2260/021; B32B 2607/00; B32B 2307/72; B32B 2307/54; B32B 2262/106; B32B 2262/0269; B32B 2260/046; B32B 2250/40; B32B 2038/0084; B32B 2266/0214; B32B 37/08; B29K 2075/00; C08J 9/141
See application file for complete search history.

(56) References Cited

U.S. PATENT DOCUMENTS 6,675,852 B2 * 1/2004 Calmidi .................. B30B 5/067
100/326
6,780,280 B2 * 8/2004 Halterbeck ........... B30B 15/061
100/295
2010/0129584 A1 5/2010 de Groot

FOREIGN PATENT DOCUMENTS

EP  0 636 463 A1  2/1995
GB  1 518 847 A   7/1978
(Continued)

OTHER PUBLICATIONS

Trimen boiling point calculator, http://www.trimen.pl/witek/calculators/wrzenie.html, (Internet archive capture dated Jun. 26, 2012) (Year: 2012).*

(Continued)

Primary Examiner — Michael N Orlando
Assistant Examiner — Christopher W Raimund
(74) Attorney, Agent, or Firm — Thomas|Horstemeyer, LLP

(57) ABSTRACT

The invention relates to a method of manufacturing a sandwich panel comprises the steps of:
a) providing a plate-shaped assembly of a first cover part and a second cover part and between these cover parts a core part of a thermoplastic material containing a physical blowing agent,
b) heating the assembly resulting from step a) under pressure between press tools in a press to a foaming temperature below the glass transition temperature of the thermoplastic material in the core part, thereby effecting adhesion of the foamed core part to the first and second cover parts
c) foaming the thermoplastic material in the core part under pressure and at the foaming temperature wherein the spacing between the press tools is increased;
d) a cooling step of cooling the foamed sandwich panel resulting from step c), while the sandwich panel is maintained under pressure between the press tools;
e) removing the thus cooled sandwich panel from the press; and
f) drying the sandwich panel thus obtained;
wherein the cooling step d) comprises.a first substep d1) of cooling the foamed assembly from the foaming temperature to an intermediate temperature in the range of 70-100° C. at a first cooling rate and a second substep d2) of cooling the foamed assembly from the intermediate temperature to ambient temperature at a second cooling rate, the second cooling rate is less than the first cooling rate.

9 Claims, No Drawings

(51) Int. Cl.
  *B29C 44/12* (2006.01)
  *B29C 44/58* (2006.01)
  *B32B 5/02* (2006.01)
  *B32B 5/24* (2006.01)
  *B32B 15/04* (2006.01)
  *B32B 27/06* (2006.01)
  *B32B 27/20* (2006.01)
  *B32B 27/28* (2006.01)
  *B29K 75/00* (2006.01)
  *B29C 35/16* (2006.01)
  *B29C 71/02* (2006.01)

(52) U.S. Cl.
  CPC .... *B29C 2071/025* (2013.01); *B29K 2075/00* (2013.01); *B32B 2250/40* (2013.01); *B32B 2260/021* (2013.01); *B32B 2260/023* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2307/54* (2013.01); *B32B 2307/72* (2013.01); *B32B 2607/00* (2013.01)

(56) References Cited

FOREIGN PATENT DOCUMENTS

| WO | 86/04017 | 7/1986 |
| WO | 2006080833 | 8/2006 |

OTHER PUBLICATIONS

Kluit et al., "Replacement of acetone in acetone-swollen polyetherimide (PEI) foils with 1,1,1-trichloroethane or ethanol: An [14C] acetone aided radiotracer study", Journal of Radioanalytical and Nuclear Chemistry, vol. 219, No. 1, pp. 47-50 (1997). (Year: 1997).*
International Search Report and Written Opinion for International Application PCT/NL2016/050488 dated Oct. 31, 2016, 11 pages.
International Preliminary Report on Patentability for International Application PCT/NL2016/050488 dated Jun. 12, 2017, 14 pages.
Kluit "The development of in-situ foamed sandwich panels", Thesis Delft University of Technology, 1997, p. 63.

\* cited by examiner

METHOD OF MANUFACTURING SANDWICH PANEL

CROSS-REFERENCE TO RELATED APPLICATIONS

This application is the National Stage of International Application No. PCT/NL2016/050488, filed 7 Jul. 2016, having the title "METHOD OF MANUFACTURING A SANDWICH PANEL" which claims the benefit of and priority to Netherlands Application No. 2015138, filed on 10 Jul. 2015, the contents of all of which are incorporated by reference as if fully set forth herein.

TECHNICAL FIELD

The present invention relates to a method of manufacturing a sandwich panel, comprising a foamed core part between two cover parts, according to the so-called in situ foaming technique.

BACKGROUND

EP 636463 A1 has disclosed this so called in-situ foaming technique. This known technique comprises the steps of providing a sheet of a thermoplastic material comprising an amount of a suitable physical blowing agent (a swelling agent or solvent), placing this sheet between two fibre-reinforced cover layers of a similar thermoplastic material, placing the assembly of thermoplastic core and fibre-reinforced cover layers between two heated press plates, supplying heat and pressure to the assembly and upon reaching a foaming temperature, causing foaming of the thermoplastic core by increasing the spacing between the press plates, cooling the press plates when a predetermined foamed core thickness is obtained, while the sandwich panel thus obtained is kept under pressure, followed by a drying step to reduce the content of remaining physical blowing agent or solvent.

WO 2006080833 A1 has disclosed that during the drying step at elevated temperature of the in situ foaming technique the remaining physical blowing agent is preferably removed, while the outflow thereof via the peripheral edges of the foamed core is restricted.

It is also known from a thesis "The development of in-situ foamed sandwich panels" of P. W. C. Kluit, Delft University Press, 1997, page 63, that optimized parameters regarding mechanical properties for the in-situ foaming of PEI using acetone as a physical blowing agent were:
Acetone weight percentage: 11.5-12.5
Foaming temperature: 180° C.
Initial pressure: 3 MPa
Heating time: 20 sec
Opening speed press: 0.4-0.5 mm/sec
Final height: 10-11 mm
Cooling rate: 100° C./min until 90° C., followed by 20° C./min until 20° C.

Kluit explains that experiments for 25×25 cm sandwiches had shown that a rapid cooling at 100° C./min from the foaming temperature to ambient temperature always resulted in a bad adhesion. Based on experimental results an intermediate temperature of 90° C. for decreasing the cooling rate was chosen in view of adhesion strength between the foamed core part and the cover part. Although these results were promising, this adhesion is still poor locally. This became more evident upon upscaling to larger dimensions of the sandwiches. Upon upscaling the strength values cited by Kluit were not achieved.

From WO 86/04017 A1 a method of manufacturing blocks of polyurethane or other open-cell foam by an exothermic reaction of starting materials, wherein once the reaction has reached a desired stage of completion a cooling gas is passed through the body of the block to carry away the heat of reaction until a stable temperature is reached.

SUMMARY

Therefore the invention aims at providing a sandwich panel of the described nature in accordance with the in situ foaming technique, wherein the adhesion between the foamed core part and the cover parts is improved.

Accordingly, the method according to the invention of manufacturing a sandwich panel comprises the steps of:
a) an assembling step of providing a plate-shaped assembly of a first cover part and a second cover part and between these cover parts a core part of a thermoplastic material containing a physical blowing agent;
b) a heating step of heating the assembly resulting from step a) under pressure between heated press tools in a press to a foaming temperature below the glass transition temperature of the thermoplastic material in the core part, thereby effecting adhesion of the foamed core part to the first and second cover parts;
c) a foaming step of foaming the thermoplastic material in the core part under pressure and at the foaming temperature wherein the spacing between the press tools is increased;
d) a cooling step of cooling the foamed sandwich panel resulting from step c), while the sandwich panel is maintained under pressure between the press tools;
e) a discharging step of removing the thus cooled sandwich panel from the press; and
f) a drying step of drying the sandwich panel thus obtained;
wherein the cooling step d) comprises a first substep d1) of cooling the foamed assembly from the foaming temperature to an intermediate temperature in the range of 70-100° C. at a first cooling rate and a second substep d2) of cooling the foamed assembly from the intermediate temperature to ambient temperature at a second cooling rate, wherein the first cooling rate is at least 140° C./min and wherein the second cooling rate is less than the first cooling rate.

In the method according to the invention first a plate shaped assembly is prepared by stacking a first cover part, a core part made of a thermoplastic material containing a sufficient amount of blowing agent for foaming to the final thickness achieved in subsequent steps, and a second cover part, onto one another. Typically these parts will be present as sheets or films. The plate-shaped assembly is usually flexible and adapts to the shape of the press tools, which may be flat in order to produce flat (planar) sandwich panels. A more complex shape of the press tools such as curved or double curved in different directions, e.g. for manufacturing a roof of a car or an interior sidewall panel for an aircraft, is also contemplated. Typically the press tools such as flat press plates are releasably mounted in the press.

The assembly is heated to a foaming temperature between heated press plates in a pressurized condition in order to prevent premature expansion of the core part and in order to simultaneously generate bonding of the core part to be foamed to the cover parts. At the foaming temperature the press is opened in a controlled manner, thereby allowing the core part to foam. Upon reaching the predetermined thickness of the panel determined by the height of the foamed core part the thus obtained sandwich panel is cooled according to a multistep process. However, compared to the known prior art two step process, the cooling rate of the first substep between the foaming temperature and the intermediate temperature is much higher. The second substep can be performed under conditions known from the prior art.

It has appeared that by increasing the cooling rate in the first substep the adhesion is improved significantly and local defects are less likely to be present.

The method according to the invention can be performed using any thermoplastic plastic material in the core part, which thermoplastic can be foamed by a blowing agent. Examples of suitable thermoplastics include polyetherimide (PEI), polyethersulfone (PES), polysulfone (PSU), polyphenylenesulphide (PPS), polyphenylsulfone (PPSU), polyketone, liquid crystal polymers, polycarbonate (PC), propylene etc. A preferred thermoplastic for use with a physical blowing agent is polyetherimide (PEI).

The core part contains an amount of physical blowing agent, that is sufficient for foaming the thermoplastic material in the core part to the desired final thickness. This thickness is determined by the final distance achieved between the press tools in the foaming step c) and cooling step d). Typical examples of the physical blowing agent include low boiling organic compounds. A preferred example is acetone.

In the foaming step a closed cell foam is formed, typically an anisotropic foam with elongate cells that are oriented in the height direction (that is to say the largest dimension of the cells extend in a direction from one cover part to the other cover part).

The cover parts can be suitably selected from sheets of thermoplastic material, metals and combinations thereof. Suitably the thermoplastic material, if any, of a cover part is the same as the thermoplastic material of the thermoplastic core part. Suitable thermoplastic materials include polyethersulfone (PES), polyphenylsulfone (PPSU) and polysulfone (PSU), in particular polyetherimide (PEI) in view of their favourable flameretarding properties. However, combinations of different thermoplastics are also contemplated. Suitable examples thereof comprise inter alia PEI core part between cover parts, wherein at least one of the cover parts is made from PS or PC, and a PES core part and at least one PC cover part. Aluminium is a preferred metal for a cover part in view of weight. In view of weight and strength in an advantageous embodiment at least one of the first and second cover part comprises one or more consolidated layers of a fibre-reinforced thermoplastic.

Here it is noted, that if a cover part comprises multiple sublayers of (fibre-reinforced) plastic material, these layers are consolidated (that is to say subjected to a heat treatment above the glass transition temperature in a pressurized condition), such that the (fibre-reinforced) thermoplastic sublayers are irreversibly adhered to one another and form a single integral cover part. This consolidation step is necessary as during the foaming step no bonding would occur between these layers, as the physical blowing agent cannot diffuse from the core part through an adjacent layer onto the interface between the layers of the cover part.

Glass fibres are a preferred example of reinforcement, if present in a cover part. However other inorganic fibres, such as metal fibres, carbon fibres and organic fibres like aramid fibres, can be applied. In addition to the above synthetic fibres natural fibres can also be used. The fibres in the reinforcement of a cover part may optionally be oriented, and there are no restrictions whatsoever on the length and orientation. Knitted fabrics, woven fabrics, mats, cloths and unidirectional fibres represent various manifestations thereof.

The heating step, foaming step and drying step are performed under conditions similar to those disclosed in the above mentioned state of the art documents, depending on the starting materials and dimensions. Typically the pressure during the heating step, foaming step and cooling step is in the range of 3-5 MPa. Higher pressures are also contemplated. In heating step b) the assembly is arranged in the press, which is preferably preheated. Upon heating the assembly between the press tools the temperature of the assembly reaches the foaming temperature (e.g. 175-182° C. for a PEI core part), whereafter the distance between the press plates is increased to a predetermined value. In cooling step d) the foamed assembly, while kept in the press under pressure (usually essentially the same pressure as during foaming) is cooled down to ambient temperature as explained above. In a first cooling step d1) the sandwich is cooled at a cooling rate of at least 140° C./min, preferably over 200° C./min, more preferably more than 240° C./min until the intermediate temperature, e.g. 90° C. Subsequently a second cooling treatment is carried out wherein the foamed sandwich panel is further cooled from the intermediate temperature at a much lower average cooling rate, preferably less than half of the first cooling rate, more preferably at 25° C./min or less, such as 20° C./min. If the cooling rate in the first cooling step is less than 140° C., then adhesion is poor. High cooling rates above 200° C./min, such as over 240° C./min provide better results.

After unloading the thus obtained sandwich panel from the press, the sandwich panel is subjected to a drying treatment. This drying treatment is preferably carried out by increasing the temperature in intervals up to a temperature in the range of about 150° C. to about the glass transition temperature of the foamed core thermoplastic. For PEI the Tg is 217° C. The temperature increase between intervals is usually about 10 degrees. The sandwich panel is maintained at each intermediate temperature for a sufficient period of time, for example two hours. Advantageously the drying step e) is initiated within 10-12 hours after the end of the foaming step b). If at least one of the cover parts comprises a thermoplastic material the drying is preferably carried out as disclosed in WO 2006/080833 A1.

The sandwich panels obtained using the method according to the invention can be further processed, for example shaping to the desired final shape by edge finishing. The sandwich panels made in accordance with the present invention are advantageously used in light weight applications where fireproof properties and/or sufficient strength/stiffness are required. A preferred application area is the transport sector, in particular the air- and spacecraft industry.

In order to achieve the high cooling rate in the first substep d1) typically the press plates made of tool steel is provided with parallel bores, wherein a forced flow of cooling water is generated in opposite directions in adjacent bores. Now it has appeared that if there are temperature differences in the plane of a press tool (non-homogeneous cooling) the appearance of the obtained sandwich may be poor, in particular the positions of the cooling bores might be reflected and might be visible as discoloured areas. Moreover, the adhesion between cover part and foamed core part might not be homogeneous inducing the risk of local failure at that interface instead of within the foamed core part.

Therefore during substeps d1) and d2) the temperature difference between the press plates is preferably less than 2° C. (measured 4 mm below the surface of the press plates).

In some cases depending on factors like dimensions of the sandwich panel, the construction material of the press, cooling capacity and the like it has appeared difficult to reduce the temperature of a press tool homogenously (meaning that there is substantially no temperature difference over the surface of a press tool). In such conditions it has proven to be useful to provide a layer of material having a heat conductivity coefficient higher than that of the construction material of the press. A layer of copper or aluminium, such as a woven mat thereof, is a preferred example. Such a mat or sheet can be easily be arranged at both sides of the assembly in step a) of the process according to the invention, or be inserted in the press itself. This layer of material having a high heat conductivity coefficient contributes to equalizing the temperature of the press during cooling, thereby reducing the temperature variations over the surface of a press tool and reducing the temperature difference between the press tools. This embodiment contributes to a homogeneous cooling with the result that no traces from the cooling bores of the press plates are visible in the sandwich obtained.

EXAMPLES

The invention is further illustrated by means of the following Examples.

Example 1

First and second cover parts: each one layer US-style 7781 glass fabric PEI (polyetherimide) impregnated and consolidated with 33+−2% PEI, layer thickness=0.23 mm;

Thermoplastic core part: two films of PEI, (Polyetherimide) Ultem 1000, impregnated with 12.1-12.9 wt. % acetone, film thickness in the range of 250-300 micrometres.

The percentage of acetone in the film is determined as ((weight of film+acetone in g) minus (weight of the neat film in g)) divided by (weight of the neat film in g).

Several FITS panels (planar dimensions 50×30 cm) were manufactured with the following configuration:

A symmetrical stack was assembled with the two acetone impregnated PEI films as core part between the identical first and second cover parts, either each consisting of one or two glass fabric layer(s) as indicated above. This assembly was placed between the heated press plates of the press. After closing the press the assembly was heated in seconds to the required foaming temperature of 178-180° C. The centre of the temperature measuring device (Pt element type K) is located 4 mm below the surface of the press plates. Pressure is 4 Mpa. Upon reaching this foaming temperature the press—while maintaining pressure at essentially the same value—was opened according to a certain foaming curve to a predetermined thickness (as specified below) of the final sandwich panel, after which the press plates and consequently the thermoplastic sandwich panel were cooled from the foaming temperature to 90° C. in 25 seconds, and further down to ambient temperature at an average cooling rate of 20° C./min. Finally the sandwich panels thus obtained were subjected to a drying step according to WO2006080833 A1 by taping the edges to reduce peripheral outflow of acetone and direct it through the cover parts using temperature increases of 10° C. between intervals of 2-4 hours at a given temperature.

In this way sandwich panels with thicknesses of 9.5 and 7.5 mm were manufactured. The sandwich panels were tested for the adhesion between the fibre-reinforced thermoplastic PEI cover parts and the in-situ foamed PEI core part using an in plane tensile strength test procedure according to ASTM C297.

The 9.5 mm thick in-situ foamed thermoplastic sandwich panel having a foam density of 85 kg/m$^3$ (core part made from 2 PEI films acetone impregnated of 300 micrometers) showed an average flatwise tensile strength of 3.4 MPa. The 7.5 mm thick in-situ foamed thermoplastic sandwich panel having a foam density of 90 kg/m$^3$ (core part made from 2 PEI films acetone impregnated of 250 micrometers) showed an average flatwise tensile strength of 3.9 MPa.

Typically, failure of the test samples occurred in the thermoplastic core part, indicating that the adhesion between the core part and cover parts is adequate. The cover parts could not be peeled manually from the foam core.

Example 2

First and second cover parts: each one layer US-style 7781 glass fabric PEI (polyetherimide) impregnated and consolidated with 33+−2% PEI, cover part thickness=0.23 mm; or each two layer US-style 7781 glass fabric PEI (polyetherimide) impregnated and consolidated with 33+−2% PEI, cover part thickness=0.46 mm Thermoplastic core part: three films of PEI, (Polyetherimide) Ultem 1000, impregnated with 12.1-12.9 wt. % acetone, film thickness of 250 micrometres.

An assembly was prepared from the thermoplastic core part in between the first and second cover parts. This assembly was subjected to in situ foaming as outlined in EXAMPLE 1 using the same conditions.

Sandwich panels (25×25 cm) having a thickness of 11.3 mm were obtained. The thermoplastic sandwich panel having cover parts comprising one layer glass fabric impregnated with PEI had a foam density of 87 kg/m$^3$ and showed an average flatwise tensile strength of 3.5 MPa. The thermoplastic sandwich panel having cover parts comprising two consolidated layers glass fabric impregnated with PEI had a foam density of 91 kg/m$^3$ and showed an average flatwise tensile strength of 3.9 MPa.

Typically, failure of the test samples occurred in the thermoplastic core part, indicating that the adhesion between the core part and cover parts is adequate. The cover parts could not be peeled manually from the foam core.

The same test results were obtained with sandwich panels of 50×30 cm.

Example 3 (Comparative)

First and second cover parts: each one layer US-style 7781 glass fabric PEI (polyetherimide) impregnated and consolidated with 33+−2% PEI, cover part thickness=0.23 mm; or each two layer US-style 7781 glass fabric PEI (polyetherimide) impregnated and consolidated with 33+−2% PEI, cover part thickness=0.46 mm Thermoplastic core part: three films of PEI, (Polyetherimide) Ultem 1000, impregnated with 12.1-12.9 wt. % acetone, film thickness of 250 micrometres.

An assembly was prepared from the thermoplastic core part in between the first and second cover parts. This assembly was subjected to in situ foaming as outlined in EXAMPLE 1 except that the obtained sandwiches were cooled from the foaming temperature to 90° C. in 40 seconds. Sandwich panels (25×25 cm) having a thickness of 11.3 mm were obtained. The thermoplastic sandwich panel having cover parts comprising one layer glass fabric impregnated with PEI had a foam density of 87 kg/m³ and showed an average flatwise tensile strength of 1.8 MPa. The thermoplastic sandwich panel having cover parts comprising two consolidated layers glass fabric impregnated with PEI had a foam density of 91 kg/m³ and showed an average flatwise tensile strength of 2.3 MPa.

Failure of the test samples occurred at the interface between the fibre-reinforced thermoplastic cover part and the in situ foamed core part, indicating that the adhesion at the interfaces was less than the strength of the foam. Also the cover parts could be peeled manually of the foam core part rather easily The same results were obtained with panels having dimensions of 50×30 cm.

The invention claimed is:

1. Method of manufacturing a sandwich panel comprising the steps of:
   a) an assembling step of providing a plate-shaped assembly of a first cover part and a second cover part and between these cover parts a core part of a thermoplastic material containing a swelling agent, wherein the thermoplastic material of the core part is an amorphous polymer of polyetherimide (PEI), and the swelling agent is acetone;
   b) a heating step of heating the assembly resulting from step a) under pressure between heated press tools in a press to a foaming temperature below the glass transition temperature of the thermoplastic material in the core part;
   c) a foaming step of foaming the thermoplastic material in the core part under pressure and at the foaming temperature wherein the spacing between the press tools is increased;
   d) a cooling step of cooling the foamed sandwich panel resulting from step c), while the sandwich panel is maintained under pressure between the press tools;
   e) a discharging step of removing the thus cooled sandwich panel from the press; and
   f) a drying step of drying the sandwich panel thus obtained;
   wherein the cooling step d) is carried out in two substeps, comprising a first substep d1) of cooling the foamed assembly from the foaming temperature to an intermediate temperature in the range of 70-100° C. at a first cooling rate of at least 216° C./min and a second substep d2) of cooling the foamed assembly from the intermediate temperature to ambient temperature at a second cooling rate of 20° C./min or less, thereby effecting bonding of the foam core part to the first and second cover parts.

2. Method according to claim 1, wherein during substeps d1) and d2) the temperature difference between the press tools is less than 2° C.

3. Method according to claim 1, wherein the surface of the press tools is provided with a layer of a material having a heat conductivity coefficient, which is higher than that of the construction material from which the press tools are made.

4. Method according to claim 3, wherein the layer of material having the higher heat conductivity coefficient is a layer made of copper or aluminium.

5. Method according to claim 1, wherein at least one of the first and second cover parts comprises a layer of a thermoplastic.

6. Method according to claim 5, wherein the thermoplastic of a cover part is selected from the group consisting of polyetherimide (PEI), polyethersulfone (PES), polyphenylsulfone (PPSU) and polysulfone (PSU).

7. Method according to claim 5, wherein at least one of the first and second cover parts comprises a layer of a fibre-reinforced thermoplastic.

8. Method according to claim 2, wherein the surface of the press tools is provided with a layer of a material having a heat conductivity coefficient, which is higher than that of the construction material from which the press tools are made.

9. Method according to claim 6, wherein at least one of the first and second cover parts comprises a layer of a fibre-reinforced thermoplastic.

* * * * *